Nov. 20, 1951   A. D. MacLEAN   2,575,964
OPERATING MECHANISM
Filed Sept. 14, 1948   2 SHEETS—SHEET 2

INVENTOR
ALLEN D. MACLEAN
By Edward Hopes III
His attorney.

Patented Nov. 20, 1951

2,575,964

UNITED STATES PATENT OFFICE 2,575,964

OPERATING MECHANISM

Allen D. MacLean, Pittsburgh, Pa., assignor to H. K. Porter Company, Inc., Pittsburgh, Pa., a corporation of Pennsylvania Application September 14, 1948, Serial No. 49,183

8 Claims. (Cl. 74—102)

This invention relates to operating mechanism. It has to do with operating mechanism for transmitting motion between a linearly movable element and a turnable element.

While my operating mechanism is of general utility it was originally designed and in some respects is especially well adapted for the operation of valves. It provides a simple and inexpensive yet rugged and foolproof connection between a linearly movable element and a turnable element. While either the linearly movable element or the turnable element may be the driving element and the other the driven element, my operating mechanism has great utility in the operation of rotary valves, in which application the linearly movable element is the driving element and the turnable element is the driven element.

Purely for purposes of explanation and illustration the invention will be described as embodied in operating mechanism for turning a tapered rotary plug valve. Such valves are made in a wide variety of sizes. The smaller valves may be turned by hand but the larger valves require considerable force for operation. In some cases they are operated by compressed fluid such as oil or other hydraulic fluid. In the embodiment of the invention selected for the purposes of explanation and illustration the linearly movable element, which is the driving element, is shown as being fluid operated.

Since the linearly movable element and the turnable element move in divergent paths, it is necessary to provide a connection between them which will effectively transmit motion upon driving of one or the other of the elements. I provide a projection and socket connection which is effective for transmitting motion between the linearly movable element and the turnable element while compensating for convergence or divergence of the paths of the elements.

I provide operating mechanism comprising a turnable element, a linearly movable element, a projection on one of the elements and a socket in the other element receiving the projection, one of the elements having a portion movable during turning of the first mentioned element and linear movement of the second mentioned element while the projection is disposed in the socket to compensate for convergence or divergence of the paths of the elements. Desirably the operating mechanism comprises an element turnable in a plane, an element linearly movable in a plane parallel to the first mentioned plane, a trace of the path of either element in the plane of movement of the other intersecting or at least closely approaching at one point the path of the latter, one of the elements having a portion thereon movable relatively thereto, a projection on one of said portions and the element not having said portion and a socket in the other thereof receiving the projection, said portion moving on the element having it during simultaneous movement of the elements while the projection is disposed in the socket as the paths of the elements converge or diverge.

More specifically I provide operating mechanism comprising a turnable element, a linearly movable element, a turnable portion on the linearly movable element, a projection on one of the turnable portions and the turnable element and a socket in the other thereof receiving the projection, the turnable portion turning on the linearly movable element during simultaneous movement of the elements while the projection is disposed on the socket. The turnable element may be pivoted lever and the linearly movable element may be a rod mounted for axial movement. The turnable portion on the linearly movable element may be a collar on the rod mounted for turning movement about the axis of the rod but maintained against movement relatively to the rod axially thereof. I find it expedient to provide the projection on the collar and the socket in the lever so that the collar turns on the rod during simultaneous movement of the rod and lever while the projection is disposed in the socket.

Desirably I provide two rods disposed coaxially end to end, a member connected with one rod and having a portion cooperating with the other rod so that the member and the second mentioned rod are maintained against relative axial movement while being relatively turnable, means for guiding the rods for axial movement as a unit, a turnable element, a projection on the member and a socket in the turnable element receiving the projection, the member turning relatively to the second mentioned rod during simultaneous movement of the rods and turnable element while the projection is disposed in the socket. The member may be a collar connected with one rod and embracing a portion of the other rod. In that case means are provided maintaining the collar and the second mentioned rod against relative axial movement while permitting relative turning thereof.

The linearly movable element may conveniently be used for turning the turnable element. To this end I may provide a cylinder, a piston operable in the cylinder, a rod connected with the piston linearly movable upon movement of the piston in the cylinder, a turnable element, one of the rod and turnable element having a portion thereon movable relatively thereto, a projection on one of said portion and the element not having said portion and a socket in the other thereof receiving the projection whereby upon movement of the rod the turnable element is turned through the projection and socket connection between the rod and turnable element.

I still further provide, in combination, a valve turnable between open and closed positions, the valve having a stem coaxial with the axis of turning of the valve, a lever connected with the stem and projecting therefrom so as to be turnable about the axis of the stem, a linearly movable element, means for moving said element linearly, a projection on one of the lever and said element and a socket in the other thereof receiving the projection, one of the lever and said element having a portion movable during linear movement of said element while the projection is disposed in the socket to compensate for convergence or divergence of the paths of the lever and said element whereby the valve is turned upon movement of said element.

Other details, objects and advantages of the invention will become apparent as the following description of a present preferred embodiment thereof proceeds.

In the accompanying drawings I have shown a present preferred embodiment of the invention in which:

Figure 3 is a fragmentary vertical cross-sectional view to enlarged scale of a portion of the mechanism shown in Figures 1 and 2.

Figure 1:
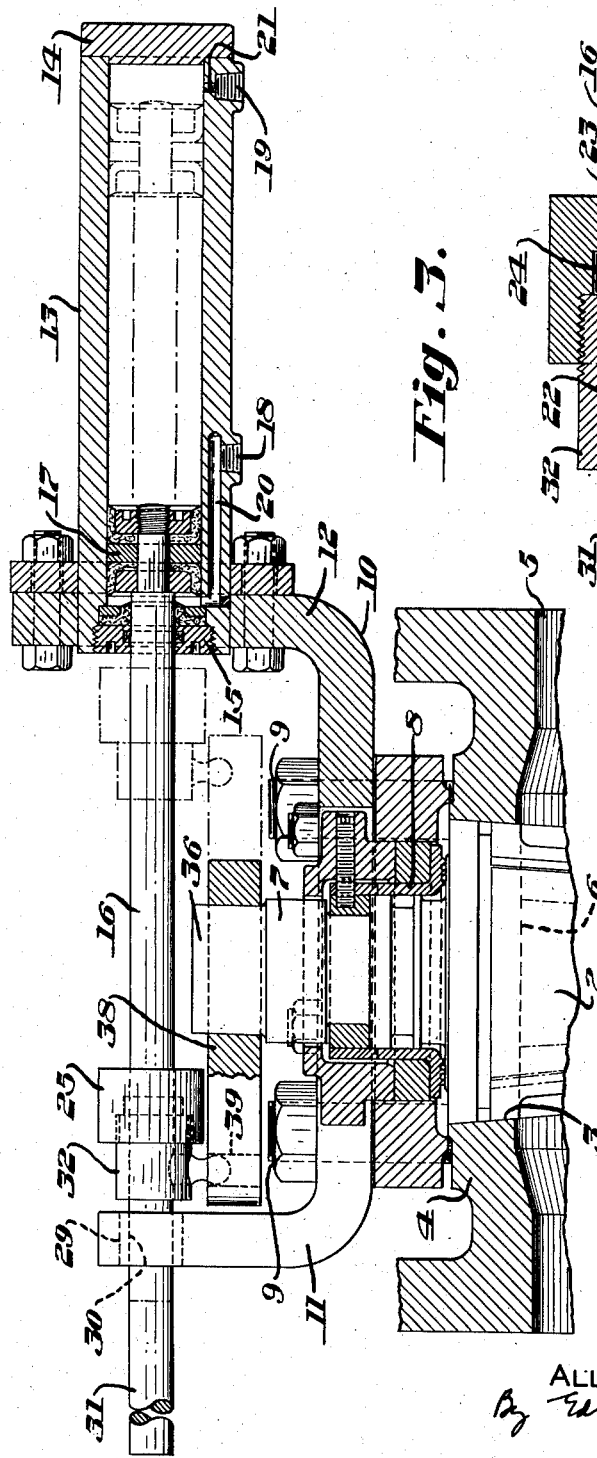
Figure 1 is a fragmentary of a plug valve and operating mechanism therefor.

Referring now more particularly to the drawings, there is shown a tapered plug valve 2 operable in a socket 3 tapered to conform to the taper of the valve 2, the socket 3 being formed in a casing member 4 through which passes a duct 5. The duct 5 is adapted to be selectively closed and opened by the plug valve 2. That valve has therethrough a passage 6 which when the valve is in the position shown in Figures 1 and 2 is aligned with the duct 5 so that the duct is open but which, when the valve is turned about its axis through an angle of 90°, is disposed crosswise of the duct so that the duct is closed.

The valve 2 has an axial stem at its larger end, the stem being designated generally by reference numeral 7 and comprising a number of zones of different diameters as shown in Figure 1 and with which cooperates sealing means designated generally by reference numeral 8 to prevent leakage about the stem. The sealing means is bolted to the casing member by bolts 9 which also fasten to the casing member a bracket 10 having opposed upwardly projecting arms 11 and 12 offset laterally from the axis of the plug valve 2.

Figure 2:
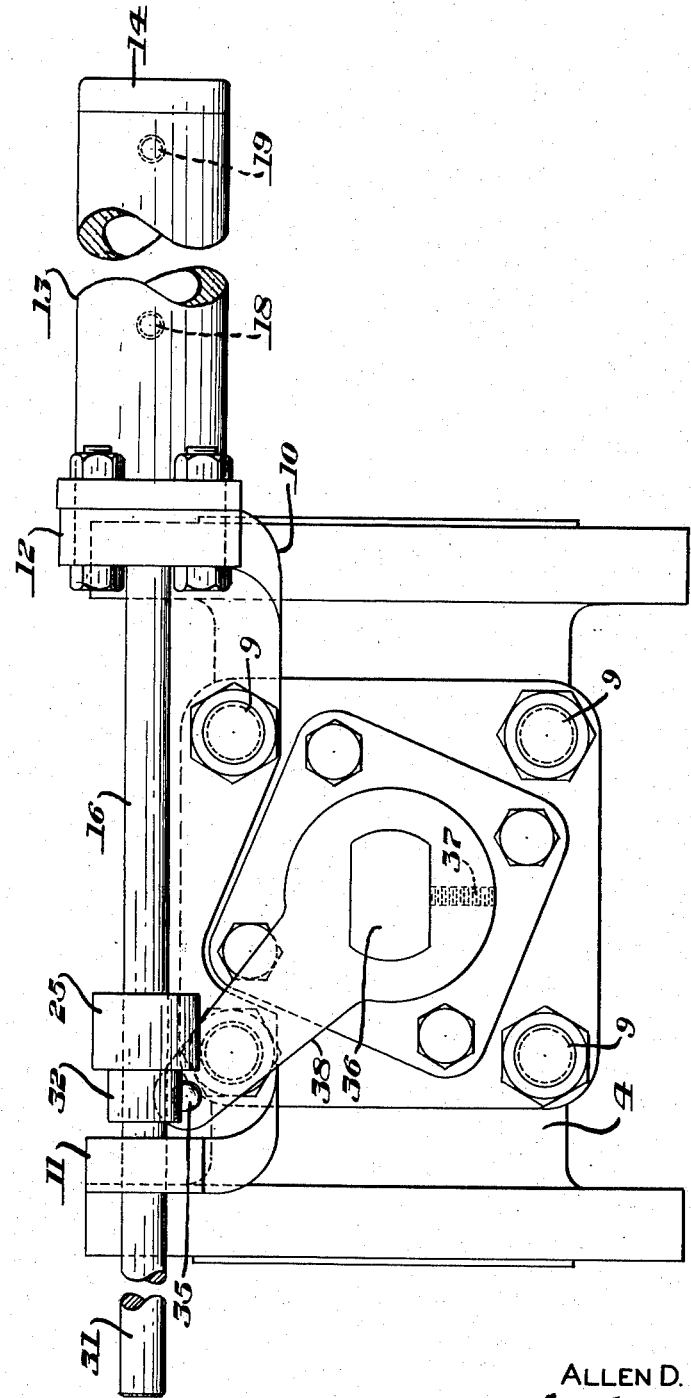
Figure 2 is a fragmentary top plan view of the mechanism shown in Figure 1.

The arm 12 carries a cylinder 13 closed at its right-hand end viewing Figures 1 and 2 by a head 14 and at its left-hand end by a screwed in head 15 through which passes a piston rod 16 connected with a piston 17 operable within the cylinder 13. The cylinder 13 has ports 18 and 19, the former communicating through a passage 20 with the left-hand end of the cylinder and the latter communicating through a passage 21 with the right-hand end of the cylinder. When compressed fluid or fluid under pressure is admitted through the port 18 and the passage 20 to the left-hand end of the cylinder 13 viewing Figures 1 and 2 the piston 17 is moved to the right and when compressed fluid is admitted through the port 19 and the passage 21 to the right-hand end of the cylinder 13 the piston 17 is moved to the left.

The piston rod 16 does not extend completely to the arm 11 but terminates at 22 as shown in Figure 3. Pinned to the rod 16 a short distance from its end 22 by a pin 23 is a collar 24. Disposed about the rod 16 is a nut 25 having at its right-hand end viewing Figure 3 a portion having a relatively small bore 26 only slightly greater in diameter than the rod 16 and having at its middle a portion having a larger bore 27 receiving the collar 24. At its left viewing Figure 3 the nut 25 has a portion 28 of relatively large bore which is internally threaded.

The arm 11 has a bore 29 therein within which is disposed a bearing bushing 30 in turn receiving a rod 31 of the same diameter as the rod 16 and coaxial therewith. The rod 13 is axially slidable within the bushing 30. The right-hand end of the rod 31 extends close to the left-hand end 22 of the rod 16 as shown in Figure 3 but the rods 16 and 31 are at all times rotatable relatively to one another, the relative rotation being brought about by mechanism to be described. A sleeve 32 receives the right-hand end of the rod 31 viewing Figure 3 and is welded to the rod 31 by a weld 33. The rod 31 terminates within the sleeve 32 so that the sleeve projects substantially beyond the end of the rod. The extremity of the sleeve 32 is externally threaded. The portion of the rod 16 to the left of the collar 24 viewing Figure 3 is inserted into the sleeve 32 and the nut 25 is threaded upon the sleeve. The sleeve 32 carries a downward projection 34 terminating in a generally ball-shaped operating member 35. The rod 31, the sleeve 32, the operating member 35 and the nut 25 constitute a unitary assembly while the rod 16 and the collar 24 constitute a second unitary assembly. The two unitary assemblies are maintained coaxial and against relative axial movement while being free for relative turning movement. Thus the operating member 35 may be moved axially of the cylinder 13 and the rods 16 and 31 by movement of the piston 17 but is free for turning movement relatively to the rod 16.

The stem 7 of the plug valve 2 has an extremity 36 to which is applied and maintained in place by a set screw 37 a lever 38 through which the valve 2 is adapted to be turned through an angle of 90° between open and closed positions. The outer end of the lever 38 extends to a position below the operating member 35 as shown in Figures 1 and 2 and contains a socket 39 receiving the ball-shaped operating member 35. The lever 38 is disposed at all times in a position at an angle to the rod 16 so that within the limits of the movement of the rod 16 that rod causes swinging of the lever 38 about the axis of the valve 2 and hence, since the lever 38 is fastened to the valve stem, turning of the valve. As the valve turns the socket 39 moves not only generally axially of the rod 16 but also transversely of the axis of the rod 16 due to the fact that it is moving in an arc about the axis of the stem 7. Movement of the socket 39 transversely of the axis of the rod 16 is compensated for by turning of the assembly which includes the operating member 35 about the axis of the rod 16. In other words, as the lever 38 turns the operating member 35 remains in the socket 39 and the assembly which includes the operating member 35 turns to permit shifting of the operating member 35 transversely of the axis of the rod 16 to always remain in operative engagement with the socket 39.

The valve 2 is, as above explained, shown in open position in Figures 1 and 2. When compressed fluid is admitted through the port 18 and the passage 20 to the left-hand end of the cylinder 13 viewing Figure 1 the piston 17 is moved to the right and the rod 16 moves with it. The collar 24 causes consonant movement to the right of the assembly consisting of the rod 31, the sleeve 32, the collar 24 and the operating member 35. But since the operating member 35 is operatively disposed in the socket 39 the movement toward the right of the assembly mentioned turns the lever 38 in the clockwise direction viewing Figure 1 through an angle of approximately 90°. During the turning movement of the lever the assembly which includes the operating member 35 turns about the axis of the rod 16, the angular position of the operating member 35 at any point during the movement being determined by the position of the lever 38 at that point. Thus the operating member 35 effects the turning of the valve 2 and while so doing is itself caused to turn about the axis of the rod 16 in the manner above described; the fact that the socket 39 moves in an arcuate path while the rod 16 moves in a rectilinear path is compensated for in a simple and effective manner.

Suitable means are provided for delivering fluid under pressure selectively to the port 18 and the port 19 whereby to turn the valve 2 to open position when it is closed and to turn it to closed position when it is open. As the means for delivering compressed fluid to the operating mechanism do not constitute the present invention such means are not shown; they may, for example, be such as are disclosed and claimed in my copending application Serial No. 49,182, filed of even date herewith.

While I have shown and described a present preferred embodiment of the invention it is to be distinctly understood that the invention is not limited thereto but may be otherwise variously embodied within the scope of the following claims.

I claim:

1. Operating mechanism comprising a turnable element, a linearly movable element, one only of the elements having a portion turnable relatively to the remainder of that element, guide means for guiding the turnable portion relatively to which the turnable portion is both linearly movable and turnable, a projection on one of said turnable portion and the element not having the turnable portion and a socket in the other thereof receiving the projection, the elements being relatively arranged so that during turning of the turnable element and linear movement of the linearly movable element the projection will remain in the socket, the turnable portion turning during such movement as the paths of the elements converge or diverge.

2. Operating mechanism comprising an element turnable in a plane, an element linearly movable in a plane parallel to the first mentioned plane, a trace of the path of either element in the plane of movement of the other intersecting or at least closely approaching at one point the path of the latter, one only of the elements having a portion thereon movable relatively to the remainder of that element, guide means for said portion in which said portion turns during movement, a projection on one of said portion and the element not having said portion and a socket in the other thereof receiving the projection, said portion moving on the element having it during simultaneous movement of the elements while the projection is disposed in the socket as the paths of the elements converge or diverge.

3. Operating mechanism comprising two rods disposed coaxially end to end, a collar connected with one rod and embracing a portion of the other rod, means maintaining the collar and the second mentioned rod against relative axial movement while permitting relative turning thereof, means for guiding the rods for axial movement as a unit, a turnable element, a projection on one of the collar and the turnable element and a socket in the other thereof receiving the projection, the collar turning on the second mentioned rod during simultaneous movement of the rods and turnable element while the projection is disposed in the socket.

4. Operating mechanism comprising two rods disposed coaxially end to end, a member connected with one rod and having a portion cooperating with the other rod so that the member and the second mentioned rod are maintained against relative axial movement while being relatively turnable, means for guiding the rods for axial movement as a unit, a turnable element, a projection on the member and a socket in the turnable element receiving the projection, the member turning relatively to the second mentioned rod during simultaneous movement of the rods and turnable element while the projection is disposed in the socket.

5. Operating mechanism comprising a linearly movable element, means for moving said element linearly, a turnable element, one only of the elements having a portion thereon movable relatively to the remainder of that element, guide means for said portion in which said portion turns during movement, a projection on one of said portion and the element not having said portion and a socket in the other thereof receiving the projection whereby upon movement of the linearly movable element the turnable element is turned through the projection and socket connection between the elements.

6. Operating mechanism comprising a linearly movable element, means for moving said element linearly, said element having thereon a turnable portion, guide means for the turnable portion in which the turnable portion turns, a projection on said portion and an elongated element turnable about an axis extending generally longitudinally thereof having a socket receiving the projection whereby upon movement of the linearly movable element the elongated element is turned through the projection and socket connection between the elements.

7. Operating mechanism comprising a linearly movable rod, a turnable element, one only of the rod and turnable element having a portion thereon movable relatively thereto, guide means for said portion in which said portion turns during movement, a projection on one of said portion and the element not having said portion and an elongated socket in the other thereof slidably receiving the projection whereby upon movement of the rod the turnable element is turned through the projection and socket connection between the rod and turnable element.

8. Operating mechanism comprising a cylinder, a piston operable in the cylinder, a rod connected with the piston linearly movable upon movement of the piston in the cylinder, a second rod disposed in coaxial end to end relationship with the first mentioned rod, a guide for the second rod, a member connected with the second rod and having a portion cooperating with the first mentioned rod so that the member and the first mentioned rod are maintained against relative axial movement while being relatively turnable, a turnable element, a projection on the member and a socket in the turnable element receiving the projection whereby upon movement of the rods the turnable element is turned through the projection and socket connection between the rods and the turnable element.

ALLEN D. MacLEAN.

REFERENCES CITED

The following references are of record in the file of this patent:

UNITED STATES PATENTS

| Number | Name | Date |
|---|---|---|
| Re. 17,990 | Davis | Mar. 10, 1931 |
| 60,952 | Sperry | Jan. 1, 1867 |
| 367,513 | Glenn | Aug. 2, 1887 |
| 904,137 | Mack | Nov. 17, 1908 |
| 1,154,008 | George | Sept. 21, 1915 |
| 1,156,135 | Doran | Oct. 12, 1915 |
| 1,208,556 | Helmholtz | Dec. 12, 1916 |
| 1,237,188 | Ferris | Aug. 14, 1917 |
| 1,239,046 | Seelig | Sept. 4, 1917 |